Oct. 26, 1954     R. L. WALLACE, JR     2,692,950
VALVE FOR INFRARED ENERGY
Filed Jan. 4, 1952
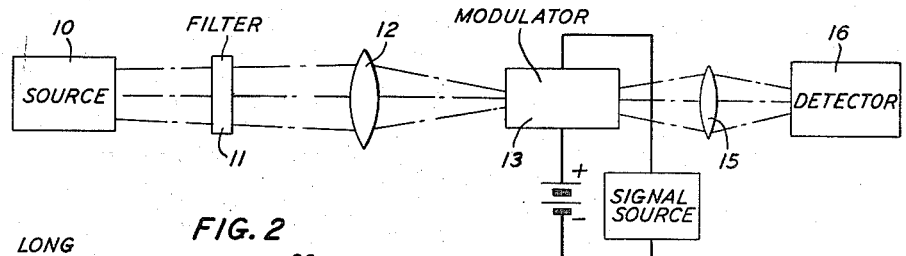
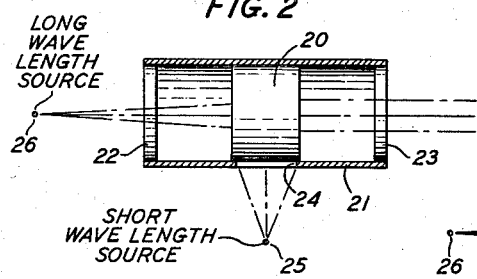
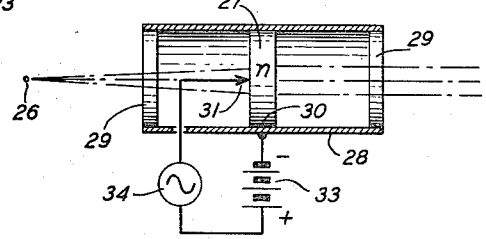
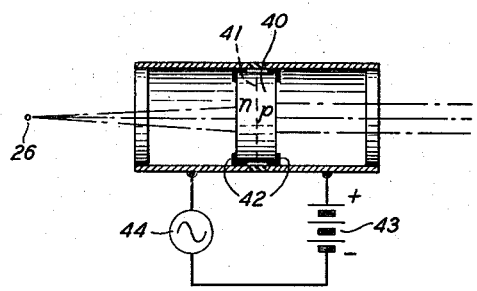
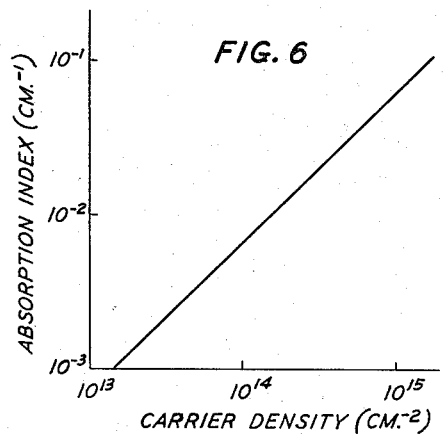
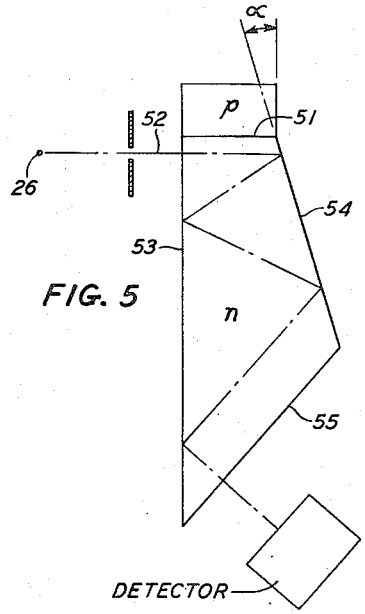
INVENTOR
R. L. WALLACE, JR.
BY
ATTORNEY

Patented Oct. 26, 1954

2,692,950

UNITED STATES PATENT OFFICE 2,692,950

VALVE FOR INFRARED ENERGY

Robert L. Wallace, Jr., Plainfield, N. J., assignor to Bell Telephone Laboratories, Incorporated, New York, N. Y., a corporation of New York Application January 4, 1952, Serial No. 264,911

11 Claims. (Cl. 250—83.3)

This invention pertains to controls for light and more particularly valves for infra-red energy.

An object of this invention is to facilitate the control of light energy, particularly infra-red light energy.

Another object of this invention is to control the light absorption of a body.

A further object is to enable absorption of light to be controlled electrically.

One feature of the invention resides in varying the absorption coefficient of an element which is transparent to light energy by varying the number of free charge carriers present in the element.

Another feature of this invention resides in injecting free charge carriers into a semiconductive element which is transparent to infra-red light to reduce the transparency in accordance with the density of free charge carriers.

Another feature resides in utilizing a semiconductive body which ordinarily is transparent to light at the long wavelength end of the spectrum as a means of varying the amount of light in a beam directed on the body which passes through the body in accordance with an applied signal. Such a body in combination with a source of light and a detector comprises a signaling system which is operable at high frequencies.

Semiconductors such as germanium and silicon are known to be highly transparent to infra-red light of greater than a particular wavelength, which has been termed the threshold wavelength. Infra-red optical elements of semiconductive material have been disclosed in the applications of Howard B. Briggs, Serial No. 120,383, filed October 8, 1949, and of Robert G. Treuting, Serial No. 145,827, filed February 2, 1950.

It appears that the transparency of semi-conductors is dependent upon the degree of energy absorption of the individual light quanta by free charge carriers as the light passes through the material. The change in transmissivity of semiconductors with wavelength occurs at a wavelength $\lambda$ such that $$\frac{hc}{\lambda} = E$$

where E is the energy gap between the filled and the conduction bands, c is the velocity of light, and $h$ is Planck's constant. Thus, below this threshold wavelength or long wave limit, E is the amount of energy required to break a valence bond in the material and light having a wavelength sufficiently short that its energy is greater than E will free electron-hole pairs in the crystal structure of the semiconductor at the rate of one pair for each quantum of incident light. The energy of the quantum is absorbed by an electron in the crystal in exciting it from the filled band across the forbidden band and into the conduction band. Those quanta of a wavelength greater than the threshold wavelength have insufficient energy to generate an electron-hole pair, their energy being less than that necessary to excite an electron in the top of the filled band across the forbidden band and into the bottom of the conduction band and therefore they pass through the material.

The width of the forbidden band in silicon and germanium is about 1.1 and 0.7 electron volts respectively. These energy values correspond to wavelengths of about 1.2 and 1.85 microns which are the threshold wavelengths for silicon and germanium respectively.

In accordance with a feature of this invention, light of longer than the threshold wavelength is absorbed to a controlled degree while traveling in a semiconductor through which it normally passes with essentially no attenuation. There are many energy levels available to an electron once it enters the conduction band and similarly there are many levels available to a hole in the filled band. This absorption of photons of threshold or longer wavelength therefore can be effected by free charge carriers in the material through the process of an energy exchange between the radiation and the carriers. The number of free charge carriers present and thus the radiation absorption is modified by controlled carrier injection, a term employed as generic to any process which alters the number of free charge carriers as for example by emission from a properly biased electrode, a forward biased point; emission for an n-p junction; excitation by bombardment with high energy particles; and excitation by incident light of less than the threshold wavelength.

While this discussion of light modulators deals principally with silicon and germanium elements it is to be understood that other semiconductors which are transparent to light and have characteristics which enable their free charge carrier density to be varied in accordance with a signal applied to a carrier injecting means are included within the scope of the invention.

The above and other objects and features of this invention will be more fully appreciated from the following detailed description when read in conjunction with the accompanying drawing in which:

Fig. 1 is a schematic diagram of a representative system to which the light modulator of this invention is applicable;

Figs. 2, 3, and 4 depict various general forms of light modulators illustrative of this invention;

Fig. 5 illustrates a form of light modulator which passes light through its modulating region a plurality of times to increase the efficiency of the device, and Fig. 6 is a log log plot of the absorption index of a germanium sample against free charge carrier density.

Referring now to the drawing, a system in which light may be modulated is shown in Fig. 1. A source 10 of light containing wavelengths greater than the threshold wavelength of the modulator element 13 of the system is shown in combination with a filter 11 which passes only those wavelengths greater than the threshold wavelength of the modulator and a suitable lens 12 focussing the filtered light on the modulator. A photosensitive cell 16, such as a lead sulphide cell, and a lens 15 focussing light which has been passed by the modulator provide means for detecting the light passed by the modulator and the fluctuations in its intensity. Any of a number of forms of translators can be applied to the modulator and detector of the system: for example, where voice signals are to be transmitted through the system, a microphone and amplifiers can be coupled to the modulator and amplifiers and a loudspeaker can be coupled to the detector. The light source may be of any convenient form, for example a silicon carbide element operated in air. A body of the same material as the modulator 13 element forms an effective filter 11. The lens 12 may be of conventional materials or may be constructed of materials which also serve as a filter of short wavelengths thereby eliminating the filter element 11; for example, where germanium or silicon modulator elements are employed it may be constructed of germanium or silicon in accordance with the disclosure of the above-mentioned Briggs application.

As pointed out above, the absorption of photons having a wavelength greater than the threshold value for the material of the modulator depends upon a transfer of photon energy to free charge carriers in the material. It, therefore, is desirable under normal conditions to have the minimum density of free charge carriers possible in the material so that absorption of photon energy is at a minimum. Several ways are available to reduce the free charge carrier density attributable inherently to the material and to random effects.

When germanium, silicon, or other elemental semiconductors are employed, the free charge carrier density depends upon the number of excess acceptor or donor centers present. These acceptor and donor centers in turn are created by lattice defects and by the presence of certain impurities. It thus follows that elemental material should have few lattice defects and either be of high purity or have an atomic balance of impurities creating the acceptor and donor centers.

The free charge carrier density in semiconductors is also increased by thermal excitation; hence the modulator when operated other than thermally preferably should be kept at a low and uniform temperature. Random excitation of free charge carriers by photons of a wavelength less than threshold for the material should also be avoided. A light shield for the modulator and the filter element 11 eliminate short wavelength photon excitation.

One form of modulator suitable for the system disclosed in Fig. 1 is shown in Fig. 2. The absorption of longer than threshold wavelength photons in the device is controlled by injecting free charge carriers into the modulating element by photoelectric means. The modulator comprises a modulating element, for example a body 20 of high purity silicon or germanium, enclosed in an opaque cylinder 21 having open ends for the passage of the light which is to be modulated. As a further shield from random light, the ends of cylinder 21 may be closed by filter elements 22 and 23 which pass only that light to which the modulator is transparent. A window 24 is arranged in the wall of cylinder 21 to admit the photons of less than threshold wavelength from source 25 to the modulating element 20. Any suitable means can be provided for varying the number of photons from source 25 which fall on the modulator; for example the power supplied to the source may be changed. Such variations in the number of these incident photons cause a corresponding variation in the number of electron-hole pairs which are freed in the semiconductor, one incident photon releasing one electron-hole pair when its frequency, $\lambda$, is sufficient that $h\lambda$ is greater than the energy gap of the material. The photons of the light beam from source 26 which are being modulated transfer their energy to the carriers in body 20 which have been freed by the short wavelength light. These free carriers acquire kinetic energy from the long wavelength photons which they give up to the crystal in the form of lattice vibrations. Thus, when no charge carriers are injected into body 20 its absorptivity of long wavelength photons is at a minimum, and this absorptivity increases with the free charge carrier density so that a correspondingly decreased output of longer than threshold wavelength photons passes out of the filter 23 at the end of modulator unit 13. This output in corresponding to the injected free charge carriers corresponds to the incident short wavelength light signal applied.

The correlation between the number of free charge carriers present in germanium and the absorption index of the germanium for radiated energy having a wavelength of 2.4 microns is shown in Fig. 6. These carriers can be created by any means, their density per cubic centimeter alone determining absorption.

Modulation of long wave light by modulated short wave light can also be effected by applying both to the same surface of the modulating body. Since free charge carriers recombine quite readily at the surface of the modulator element, the modulation by this method can be enhanced by applying a field to the surface region in which electron-hole pairs are freed to pull these carriers into the modulator element thereby distributing the increased carrier density throughout the body and reducing surface recombination. Such fields can be produced by forming the modulator body with impurity concentration gradients or by externally applied electric or magnetic fields. Where concentration gradients are employed the injected free charge carriers can be made to gravitate to a region by tapering the gradient so that only a slight predominance of one impurity type is present in that region. This technique of building fields by impurity gradients can be appreciated when it is considered that the field in volts per centimeter is equal to the product of the resistivity in the ohm centimeters and the current density in amperes per square centimeter.

Another form of modulator element 27 is shown in Fig. 3. An opaque shield 28 and short wavelength light filters 29 similar to those of the modulator unit of Fig. 2 are included in the construction. The shield 28 is in the form of a conductive tubular member and provides means for making a large area ohmic contact 30 to the periphery of modulator element 27. Those wavelengths of light to which the element 27, which may be of silicon or germanium, is ordinarily transparent are modulated by free charge carriers injected from a point contact or similar restricted area, non-ohmic emitter 31 biased in the forward direction of conduction by battery 33, which is also connected to the conductive shield 28. The physical support for the emitter may be in any convenient form, it being desirable that as little of the modulator element surface as possible be shaded from the light source. In biasing the contact in the forward direction, it is biased positive relative to an n-type semiconductive body as shown, or negative relative to a p-type body. Modulation of the emitted free charge carriers is effected by the signal source 34 connected to emitter 31 so that as the current is varied the number of injected holes is varied. These holes absorb the long wave light. When a large absorbing area is desired an array of metallic contacts biased in the forward direction of conduction may be mounted on a suitable modulator element to spread the hole or electron injection over a greater area.

A p–n junction in a semiconductive body, when properly biased, is a highly efficient large area emitter and therefore is an excellent form of long wave light modulator. As shown in Fig. 4, long wavelength light is modulated by a semiconductive body 40 containing a p–n junction 41 transverse the light path through the body. An ohmic contact 42 is made to the periphery and face of the body 40 on each side of the junction and a biasing battery 43 is connected thereto. The battery 43 is poled so that its negative terminal is connected to the n side of the body and its positive terminal is connected to the p side; thus holes and electrons are emitted over the entire junction, the holes being pulled into the n-type material and the electrons being pulled into the p-type material. A signal source 44 is included in the battery circuit to vary the current across the junction thereby varying the density of charge carriers in the region of the junction and the absorption of the long wavelength photons entering the body. While the junction in body 40 is shown with its surface normal to the beam of radiation traversing the body, junction devices have been operated successfully as radiation modulators with the plane of the junction parallel to the radiation beam.

A germanium p-n junction modulator element having the junction oriented parallel to the rays of radiation to be modulated and having a resistivity of 2 ohm centimeters on the p side and 5.2 ohm centimeters on the n side, at a current density of one ampere per square centimeter across the junction, has exhibited an absorption of about 10 per cent of the total radiation passed when no current was drawn across the junction. Silicon modulators have exhibited an absorption of about 40 per cent of the radiation normally passed and at one ampere per square centimeter absorb about 20 per cent.

The efficiency of light modulators of the type to which this invention pertains can be increased by making the light beam traverse a region containing a high density of injected free charge carriers a number of times. A plurality of passes can be attained by reflecting the beam in the interior of the modulator element at the semiconductor-to-air interface. One form of modulator element through which the beam makes several passes is shown in Fig. 5. In this construction, a section of p-type material is associated with an n-type section to provide a junction emitter 51. The modulation is carried out in the n-type section only. A light beam 52 which has been collimated enters the semiconductor normal to its surface 53. This beam continues straight through the semiconductor body to the rear face 54 which is oriented relative to the plane of the surface 50 at an angle $\lambda$ which is greater than the angle of total reflection of the beam; this angle may be about 14 degrees in germanium for light of the wavelength which it will pass. The beam is then reflected to surface 53 and strikes it at an angle of 90 degrees minus $2\lambda$ from which it again is reflected to surface 54. The form of modulator shown will usually utilize only a few reflections since for a given carrier injection the carrier density decreases rapidly as the distance from the junction is increased and therefore the absorption index of the material spaced from the junction decreases. Radiation escapes from the modulator element at a face 55 oriented so that the beam intercepts it at an angle less than the angle of total reflection and preferably normal to its plane.

Modulators of the type under discussion can be treated at their air-semiconductor interfaces to reduce the reflection of the radiation they are passing. Thus a coating of a material having a refractive index intermediate that of the semiconductor and air effectively reduces reflection. A selenium coating has been employed on germanium elements.

These modulators should also be treated to reduce dispersion of the beam at the entrance and exit surfaces by highly polishing these surfaces.

It is to be understood that the above-described arrangements are illustrative of the application of the principles of the invention. Numerous other arrangements may be devised by those skilled in the art without departing from the spirit and scope of the invention.

Reference is made to the copending application of Howard B. Briggs, James R. Haynes, and William Shockley, Serial No. 263,612, filed December 27, 1951, which is directed to related subject-matter.

What is claimed is:

1. A signaling system comprising a source of infra-red radiation, a semiconductor body which is transparent to infra-red radiation, positioned to intercept a beam of the radiation, means to alter the transparency of the semiconductor to said radiation in accordance with a signal, said means comprising means for injecting free charge carriers into the semiconductor at rates corresponding to the signal, and a detector of infra-red energy for receiving the beam of radiation from the semiconductor body.

2. A signaling system comprising a source of infra-red radiation, a semiconductor body which is transparent to the infra-red radiation positioned to intercept a beam of the radiation, an electrical signal source, an emitter of free charge carriers associated with the semiconductor body, means for applying said signal to said emitter, said emitter being arranged to inject free charge carriers into the body at rates corresponding to an electrical signal applied thereto whereby the transparency of the semiconductor body to said radiation is altered an amount corresponding to the change in free charge carrier density in the body, and a detector of infra-red energy for receiving the beam of radiation from the semiconductor body.

3. A signaling system comprising a source of infra-red radiation, a semiconductor body of a material selected from the class including silicon and germanium which is transparent to the infra-red radiation, said body having portions of opposite conductivity and an intermediate transition region, said body being positioned to intercept a beam of the radiation, an electrical contact to a portion of said body of each conductivity type, a source of electrical signals connected to said contacts for injecting free charge carriers into the semiconductor, and a detector of infra-red energy for receiving the beam of radiation from the semiconductor body.

4. A signaling system comprising a source of infra-red radiation, a semiconductor body of material selected from the class consisting of silicon and germanium which is transparent to the infra-red radiation, said body being positioned to intercept a beam of the radiation, an ohmic contact to one portion of said body, a non-ohmic contact to a portion of said body spaced from said ohmic contact, a source of electrical signals connected to said contacts for injecting free charge carriers into the semiconductor body, and a detector of infra-red energy for receiving the beam of radiation from the semiconductor body.

5. The method of modulating light of a wavelength greater than 1.2 microns which comprises passing the energy through a semiconductor which is normally transparent thereto, injecting free charge carriers into said semiconductor, and varying the rate at which charge carriers are injected in accordance with a desired signal.

6. The method of modulating light of a wavelength of at least the threshold wavelength of a semiconductive material which comprises passing the light through a body of said semiconductive material which is normally transparent thereto, electrically injecting free charge carriers into said body and modulating the rate of free charge carrier injection.

7. The method of modulating light having a wavelength greater than about 1.2 microns which comprises passing the light through a silicon body which is normally transparent thereto, electrically injecting free charge carriers into the body and modulating the rate of carrier injection.

8. The method of modulating light having a wavelength greater than about 1.8 microns which comprises passing the light through a germanium body which is normally transparent thereto, electrically injecting free charge carriers into the body and modulating the rate of carrier injection.

9. A signaling device comprising a source of infra-red light, a semiconductive body positioned to intercept a beam of said light, a source of electrical signals, and means electrically connected to said source for electrically emitting free charge carriers into said semiconductive body, whereby said infra-red light is absorbed through the transfer of the photon energy to said charge carriers.

10. The method of modulating light of a wavelength of at least the threshold wavelength of a semiconductive material which comprises, directing light of said wavelength into a body of said material, and injecting charge carriers into said semiconductive body in accordance with a signal, whereby the light is absorbed in the body at a rate corresponding to said signal.

11. The method of modulating infra-red light which comprises passing light through a semiconductive body containing portions of opposite conductivity type and an intermediate n-p junction, and passing current across said n-p junction to inject free charge carriers into the semiconductive body whereby said infra-red light is absorbed through the transfer of the photon energy to said charge carriers.

References Cited in the file of this patent

UNITED STATES PATENTS

| Number | Name | Date |
|---|---|---|
| 2,363,600 | Lawlor | Nov. 28, 1944 |
| 2,505,633 | Whaley | Apr. 25, 1950 |
| 2,588,254 | Lark-Horovitz et al. | Mar. 4, 1952 |
| 2,629,800 | Pearson | Feb. 24, 1953 |

FOREIGN PATENTS

| Number | Country | Date |
|---|---|---|
| 498,816 | Great Britain | Jan. 13, 1939 |

OTHER REFERENCES

The Physics of Electronic Semiconductors, Pearson, AIEE Technical Paper 47-34, Bell Telephone Lab., Inc., pages 1-15, December 1946.

Infra-Red Transmission of Germanium and Silicon, Becker et al., Physical Review, vol. 77, March 1, 1950, page 760.

Electrons and Holes in Semiconductors, Shockley, 1950, pages 114-115, published by Van Nostrand Co., New York, N. Y.